May 13, 1952     G. E. BROWN     2,596,759
BOREHOLE INCLINATION INDICATING DEVICE
Filed Dec. 11, 1946     2 SHEETS—SHEET 1
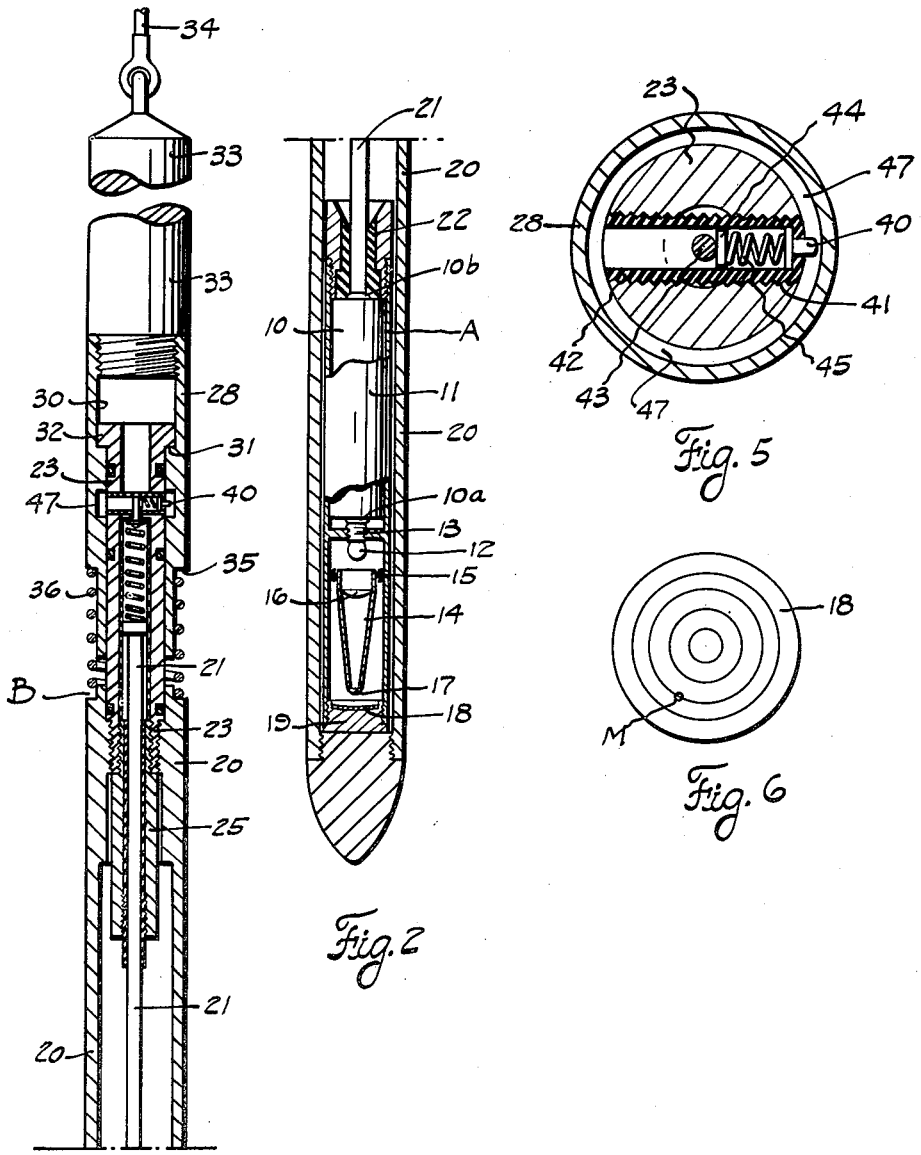
Guy E. Brown
INVENTOR.
BY Joe E. Edwards
ATTORNEY May 13, 1952      G. E. BROWN      2,596,759
BOREHOLE INCLINATION INDICATING DEVICE
Filed Dec. 11, 1946      2 SHEETS—SHEET 2
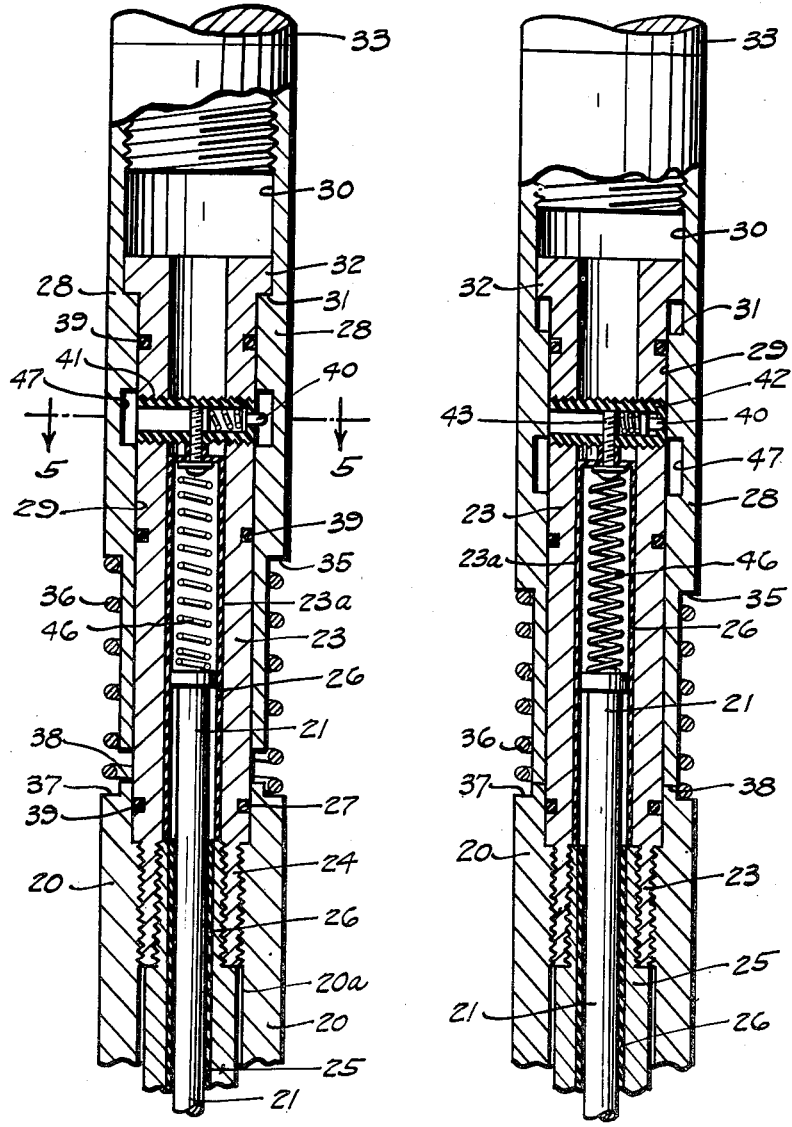
Guy E. Brown
INVENTOR.
BY Jos. E. Edwards
ATTORNEY Patented May 13, 1952

2,596,759

UNITED STATES PATENT OFFICE 2,596,759

BOREHOLE INCLINATION INDICATING DEVICE

Guy E. Brown, Houston, Tex., assignor of one-half to H. John Eastman, Denver, Colo.

Application December 11, 1946, Serial No. 715,395

7 Claims. (Cl. 33—205.5)

This invention relates to new and useful improvements in inclination indicating devices.

In the drilling of wells, it is not unusual for the drill bit to be deflected from its course during the drilling operation, such deflection being caused by inclined strata or other causes. If it is intended that the well bore be drilled on a true vertical line this deflection results in said bore inclining from the vertical and in some instances, successive deviations or variations may interfere with continued drilling and also with subsequent pumping operations. If angular drilling is being done, a slight deflection or deviation from the intended course may result in an erroneous curvature or angularity of the well bore so that the producing formation is missed entirely and never penetrated by the bit. For these reasons it is not only desirable but practically essential that the driller check the inclination of the bore hole from time to time as drilling progresses so that the inclination from the vertical of the well bore may be known throughout the drilling operation.

Various types of inclination indicating devices, generally known as "drift indicators" have been devised and are in general use. Most of these include some type of clock or timing mechanism which is pre-set prior to lowering of the instrument into the well bore. The clock or timing mechanism is adjusted so as to permit a sufficient time lapse before operation of the instrument to locate or position the instrument at the desired elevation within the well bore. If the estimated time for lowering is erroneously figured or if for some other reason the instrument is not in position at the time that the clock mechanism operates to actuate the instrument the desired record is not obtained and the instrument must be rerun.

It is one of the objects of the present invention to provide an inclination indicating apparatus or drift indicator device which is constructed so as to entirely eliminate any clock or timing mechanism for controlling the time of operation of said instrument, whereby the errors which are incident to the use of such mechanism are eliminated.

An important object of the invention is to provide an improved inclination indicating apparatus wherein the indicating mechanism is electrically operated when an electrical circuit is closed; said device incorporating an improved means, which is controlled from the surface of the well by the operator, for actuating the indicating mechanism, whereby positive operation of the instrument at the desired time is assured.

Still another object of the invention is to provide an improved inclination indicating apparatus, of the character described, wherein a circuit closing assembly is associated with the instrument and includes telescoping or movable members which are normally urged toward a separated position to hold the circuit open; closing of the circuit being accomplished merely by imposing weight upon the telescoping members to move the same toward each other, whereby the circuit closing means is operated to actuate the instrument and thereby obtain a record of the inclination of the well bore in which said instrument is disposed.

Still another object of the invention is to provide an improved circuit closing means which is constructed so that it may be readily combined or employed with any electrically controlled inclination indicating instrument.

A still further object of the invention is to provide a circuit closing apparatus for inclination indicators which involves connecting one side of the electrical circuit with "ground," said apparatus including a spring-pressed contact pin which is normally disengaged from the outer case of the assembly and which is arranged, upon the imposition of weight on the assembly, to move into engagement with said outer case to complete the electrical circuit and thereby actuate the indicating instrument.

A construction designed to carry out the invention will be hereinafter described together with other features of the invention.

The invention will be more readily understood from a reading of the following specification and by reference to the accompanying drawing, wherein an example of the invention is shown, and wherein:

Figure 1 is a view partly in elevation and partly in section of the upper portion of an inclination indicating apparatus, constructed in accordance with the invention, Figure 2 is a continuation of Figure 1 showing the lower portion of the assembly, Figure 3 is a transverse, vertical, sectional view of the upper portion of the apparatus and illustrating the contact element in a position holding the circuit open, Figure 4 is a similar view with the contact element in circuit closing position, Figure 5 is an enlarged, horizontal, cross-sectional view taken on the line 5—5 of Figure 1, and Figure 6 is a plan view of the record member.

In the drawings, the letter A designates an inclination indicating instrument which may be varied in construction since the details of said instrument form no part of the present invention. The instrument A is adapted to be electrically operated with the power source being a dry cell battery 10 which is mounted within the upper portion of the instrument housing 11. As illustrated, the inclination indicating instrument includes a light bulb 12 mounted within a suitable socket 13 which is disposed immediately below the battery 10 within the casing 11. A tubular plumb bob 14 mounted on the usual gimbal ring suspension 15 is located within the instrument casing below the lamp 12. Suitable lenses 16 and 17 are mounted within the tubular plumb bob and when the electric lamp 12 is lighted, a light beam is focused downwardly through the plumb bob onto a record disk 18. The disk is disposed within a carrier 19 which is removably threaded into the lower end of the instrument casing.

The record disk 18 is constructed of printing out paper which is arranged to be exposed by light. It will be evident that the plumb bob 14 will constantly hang in a vertical position and thus when the instrument casing 11 is inclined within an inclined well bore, the lower end of the plumb bob will be off center of the record disk. Therefore, when the lamp is lighted and the beam is directed downwardly through the tubular plumb bob, a mark or dot M (Figure 6) will be formed on the disk. This mark will, of course, be off center of the disk and its position with respect to the center of the disk will be representative of the number of degrees of inclination of the instrument casing 11 and therefore of the inclination of the well bore. The battery 10 has one contact 10a electrically connected to the electric lamp and when the opposite side of said battery is grounded, a circuit is closed which will illuminate the lamp.

The foregoing instrument and its details of construction are not novel, the instrument having been in use for some time. However, this type of electrically actuated instrument has in the past been controlled in its operation by a timing or clock mechanism. As has been stated such a timing or clock mechanism is not positive in that errors may occur with respect to the time of operation of the instrument so that in many instances the instrument is run and actuated without the desired record being obtained.

In order to positively control the time of actuation of the instrument A, a circuit closing apparatus which is generally indicated by the letter B is adapted to be connected in the assembly above the instrument A. The instrument is housed within an outer barrel or housing 20 which serves as a protective casing for said instrument. As is clearly shown in Figures 1 and 2 the instrument is located in the lower end of an outer barrel or housing 20 and said housing extends upwardly for some distance above the top of the instrument. A contact plunger 21 has its lower end engaging the upper contact 10b of the battery 10 of the instrument A and this plunger extends through a suitable packing gland 22 which is threaded into the top of the casing 11 of the inclination indicating instrument A. The upper portion of the plunger 21 extends into the lower end of an axial bore 23a of a tubular sleeve 23. This sleeve is formed with an externally threaded depending shank 24 which threads into the upper end of the bore 20a of the outer barrel 20. A tubular insulating member 25 surrounds the plunger 21 and has its upper end threaded into the lower portion of the bore 23a of the tubular sleeve 23, whereby the insulating member 25 is disposed within the bore of the outer barrel or housing 20. Both the insulating member 25 and the tubular sleeve 23 have insulating material 26 disposed within their respective bores, whereby the contact plunger 21 is electrically insulated therefrom. A suitable packing ring 27 surrounds the tubular sleeve 23 above its threaded portion and said ring packs off the joint which is made between the sleeve 23 and the upper end of the outer barrel or housing 20.

In order to lower and raise the outer barrel 20 having the instrument therein through the well bore, a tubular connecting or supporting section 28 surrounds the upwardly extending sleeve 23. The section 28 has the lower portion of its bore 29 of substantially the same diameter as the outer diameter of the sleeve 23 so that said sleeve has a sliding fit therein. The upper portion 30 of the bore of the section 28 is slightly enlarged to provide an internal annular shoulder 31 within said section and this shoulder is adapted to be engaged by an external flange 32 which is formed on the extreme upper end of the tubular sleeve 23. The upper end of the connecting section 28 is attached to a suitable sinker bar 33 which is in turn connected with the lowering cable 34.

The connecting or supporting section 28 is formed with an external shoulder 35 which is located nearer its lower end and a coiled spring 36 which surrounds the lower end of the section has its upper end engaging this shoulder. The lower end of the spring 36 engages an external shoulder 37 which is formed at the upper end of the outer barrel or housing 20 and obviously the spring 36 exerts its pressure to constantly urge the connecting section 28 upwardly and away from the upper end of the barrel or housing 20. Since the connecting section 28 is slidable upon the tubular sleeve 23 it will be evident that the imposition of the weight of the sinker bar upon the connecting section 28 will cause said section to move downwardly into engagement with the extreme upper end 38 of the outer housing 20 (Figure 4), such movement being permitted by a compressing of the spring 36. In order to pack off between the slidable connecting section 28 and the tubular sleeve 23, a pair of packing rings 39 are disposed within suitable grooves provided on the sleeve and these rings engage the bore 29 of the connecting section.

For controlling the closing of the circuit, that is, for connecting the contact plunger 21, which engages the upper battery contact 10b to ground, a contact pin 40 is mounted within the upper portion of the tubular sleeve 23. The contact pin is movable within a diametrically extending opening 41 (Figure 5) which is formed in said sleeve and said bore is suitably lined with insulating material 42 to electrically insulate the pin from the metallic material of the sleeve. A contact screw 43 (Figures 3 and 4) is disposed in the upper portion of the bore 23a of the sleeve 23 and has its upper end extending into the diametrically disposed bore or opening 41. A contact disk 44 normally engages the screw 43 to make electrical connection therewith and a coil spring 45 is interposed between the disk and the flanged end of the contact pin 40, said spring not only electrically connecting the disk and pin but also normally urging said pin to its outer position, as shown in Figures 4 and 5. To electrically connect the contact screw 43 with the elongate contact plunger 21, a coiled spring 46 is provided within the upper portion of the insulated bore 23a of the sleeve 23, the upper end of said spring being connected to the screw and its lower end engaging or connecting with the plunger 21.

When the instrument barrel 20 having the instrument therein is suspended from the connecting section 28, with the flange 32 on the upper end of the sleeve 23 engaging the internal shoulder 31 of the connecting section, the contact pin 40 is disposed opposite an enlarged annular groove or recess 47 which is formed in the connecting section 28 (Figure 1). In such position, the contact pin is spaced from the inner surface of the section and no electrical connection between said pin and the metallic inner surface of the section 28 is had. Therefore, at this time and with the parts in the position shown in Figures 1 to 3, the elongate contact plunger 21 which engages the battery contact and which has electrical connection through the spring 46, contact screw 43, contact disk 44 and spring 45 with the pin 40 is not connected to ground, with the result that the electrical circuit to the lamp 12 of the inclination indicating instrument A is not complete. It will be evident that as the assembly is lowered into the well the parts will be in the position shown in Figures 1 and 2 and the electrical circuit to the instrument A is incomplete.

When the lower end of the outer barrel or casing 20 of the instrument A strikes the bottom of the well bore or engages a suitable landing plate provided for the purpose within the well pipe, further movement of the barrel is halted. By imposing the weight of the sinker bar 33 upon the connecting section 28, said section will move downwardly with respect to the tubular sleeve 23 and outer barrel 20, such downward movement compressing the spring 36. When downward movement of the section 28 with respect to the sleeve 23 and barrel 20 occurs, the annular groove or recess 47 in the section 28 is moved downwardly in a plane below the spring pressed contact pin 40 with the result that the pin moves into engagement with the inner surface of the bore 29 of the section 28, as is clearly shown in Figure 4. When the contact pin 40 engages the metallic inner surface of the bore of the section 28, this immediately results in connecting the contact plunger 21 with ground and thereby closes an electrical circuit to the lamp 12 of the instrument, whereby said lamp is illuminated and a record formed on the disk 18. It will be obvious that the instrument A cannot operate until the barrel or outer housing 20 has been halted in its movement and sufficient weight imposed upon the connecting section 28 to move it downwardly under tension of the spring 36. Therefore, the actual operation of the instrument A is under the direct control of the operator at the surface and there is no danger of the instrument A being actuated prior to the time that the instrument is properly located.

The operation of the apparatus is believed obvious from the foregoing. The device is lowered with the parts in the position shown in Figures 1 and 2 with the instrument barrel 20 and its attached sleeve 23 suspended from the shoulder 31 within the connecting section 28. Lowering continues until the outer barrel's movement is halted either by engaging the bottom of the well bore or a suitable landing plate provided for the purpose. During the lowering operation, the contact pin 40 is located within the annular recess 47 of the connecting section and no ground connection to the battery 10 of the instrument A is had. After the barrel 20 has reached the limit of its downward movement, continued lowering imposes the sinker bar weight upon the connecting section to move said section downwardly under tension of the spring 36. Such downward movement of the section 28 with respect to the sleeve 23 causes the contact pin 40 to engage the inner surface of the bore of said sleeve and thereby connect one side of the battery 10 of the instrument A to ground, such connection being through the elongate plunger 21. The parts remain in this position for a sufficient length of time to expose a portion of the disk 18 and form the mark M thereon.

When it is desired to remove the assembly after the record is made, it is only necessary to lift upwardly on the cable 34. This results in a re-engagement of the shoulder 31 with the flange 32 of the sleeve 23, whereby the contact pin is again returned into a position opposite the annular recess 47. This breaks the ground connection and again renders the instrument A inoperative. Continued lifting by means of the cable will remove the entire assembly from the well bore.

It will be evident that a very simple control means is provided. No timing or clock mechanism is necessary and the actual operation of the instrument is under the control of the operator at the surface at all times. The device is simple and may be manufactured at a minimum cost with the various parts being rugged in construction to withstand the vibration and jar to which they are subjected during lowering and raising of the apparatus through the well bore.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An inclination indicating apparatus for well bore including, a tubular housing, an inclination indicating instrument for indicating and recording deviation of a well bore from vertical mounted within said housing, electrically actuated means including a source of electric current mounted within the lower portion of the housing and adapted to operate the instrument when the electrical circuit between said source and the instrument is closed, a tubular support surrounding and slidably connected to the upper end of the housing whereby as the housing and instrument therein are lowered and raised within a well bore by means of the support, the weight of the housing holds the same in its lowermost position relative to the support, halting of movement of the housing within which the instrument is mounted permitting the support to slide downwardly relative to said housing, a radially movable electrical switch mounted in the upper portion of the housing and electrically connected in the circuit of the instrument, the support encompassing the switch and having an annular recess within which the outer end of the switch is normally disposed when the housing is suspended from the support and said housing and support are in fully extended position relative to each other, said switch being moved out of the recess and into contact with the wall of the support to close the electrical circuit upon telescoping of the support relative to the housing, an electrical connecting means extending axially through the housing from the switch to the source of electric current and establishing an electrical connection between the switch and current source, and means electrically insulating the electrical connecting means from the housing.

2. An inclination indicating apparatus for well bores including, a tubular housing, an inclination indicating instrument for indicating and recording deviation of a well bore from vertical mounted within said housing, electrically actuated means including an electrical circuit mounted within the instrument and housing and adapted to operate the instrument when the electrical circuit is closed, a tubular support having the lower portion of its bore reduced whereby an internal annular supporting shoulder is formed within the bore, an extension secured to the upper end of the housing and slidable within the reduced portion of the bore, an external flange on the upper end of the extension adapted to seat upon the internal shoulder of the support to suspend the housing from the support, the connection allowing downward sliding movement of the support relative to the housing, a radially movable electrical switch mounted within a transverse opening in the extension, conducting means extending from the switch downwardly through the extension and housing to the instrument for electrically connecting the switch in the electrical circuit of the inclination indicating instrument, said switch comprising a spring-pressed contact normally positioned within an annular recess in the support when the housing is suspended from the support, said contact moving into engagement with the wall of the support to connect the electrical circuit to ground and thereby close said circuit upon downward movement of the support relative to the housing.

3. A control switch mechanism for an electrically operated inclination indicating instrument including, a housing within which the instrument is mounted, a source of electric current for the instrument mounted in said housing, a tubular support telescopically connected with the upper end of the housing, whereby the support may undergo movement relative to said housing, said support having an annular internal recess in its wall, a radially movable contact member mounted in the upper end of the housing and adapted to be disposed within the recess when the support is extended relative to the housing and adapted to move out of the recess to engage the wall of the support when the support is telescoped with respect to the housing, and a contact plunger having its upper end electrically connected with the contact member and extending downwardly through the housing with its lower end electrically connected with the source of electric current for electrically connecting the electric current source within the housing with the radially movable contact plunger, whereby when said plunger engages the wall of the support, the circuit to the instrument is closed to operate the same.

4. The combination with an electrically operated well survey instrument having a light source, a tubular plumb bob and a record disk of printing out proof paper with an electrical circuit for illuminating the light source to project a beam of light through the plumb bob onto the disk and thereby form an indication representative of inclination, of a control switch mechanism including, a pair of telescoping members one of which has the well survey instrument mounted therein and the other of which is connected to a lowering line, coacting means on the members for limiting their telescoping movement relative to each other, and a switch electrically connected in the electrical circuit of the instrument and operated to close said electrical circuit and thereby actuate said instrument when the members are moved relative to each other, said switch comprising a radially movable contact adapted to engage the wall of one of the members to connect the electrical circuit of the instrument to ground, said contact being disengaged when the members are in their fully extended position relative to each other and being engaged when said members are moved relative to each other into another position.

5. An inclination indicating apparatus for well bores including, a tubular housing having a reduced tubular extension extending from its upper end, a tubular support encircling the extension and adapted to undergo limited telescoping movement with respect thereto, sealing means between the upper end of the extension and the support, said support having an internal annular recess therein, a radially movable contact member mounted in the extension and disposed in the recess when the support and housing are in an extended position and adapted to engage the wall of the support when the support is telescoped relative to the housing, an electrically operated survey instrument mounted within the housing, a source of electrical current within the housing and electrically connected with the instrument, and an elongate plunger extending through the housing and its extension and electrically connecting the source of electric current with the radially movable contact member.

6. The combination with an electrically operated well survey instrument having a light source, a tubular plumb bob and a record disk of printing out proof paper with an electrical circuit for illuminating the light source to project a beam of light through the plumb bob onto the disk and thereby form an indication representative of inclination, of a control switch mechanism including, a tubular housing having the well survey instrument mounted in the lower portion thereof, an electrical conducting rod extending upwardly from the instrument axially through the housing and having its lower end electrically connected to the well survey instrument, means for electrically insulating the rod from the housing, a switch within the upper portion of the housing electrically connected with the upper end of the conducting rod, a tubular support slidably secured to the upper end of the housing and having means coacting with the electrical switch to open and close the electrical circuit to the survey instrument upon relative movement of the housing with respect to the support.

7. An inclination indicating apparatus for well bores including, a tubular housing, a tubular support slidably connected with the upper portion of the housing and adapted to undergo limited telescoping movement with respect thereto, a switch contact member mounted in the upper portion of the housing, means on the support coacting with the switch contact member upon relative movement of the support and housing to open and close said switch in accordance with the position of the housing and support, an electrically operated survey instrument mounted within the lower portion of the housing, a source of electric current within the housing and electrically connected with the instrument, an elongate conducting rod extending through the housing and electrically connecting the source of electric current with the switch contact member, and means for electrically insulating the conducting rod from the housing.

GUY E. BROWN.

REFERENCES CITED

The following references are of record in the file of this patent:

UNITED STATES PATENTS

| Number | Name | Date |
|---|---|---|
| 1,187,519 | Galvin | June 20, 1916 |
| 2,190,901 | Wilcox et al. | Feb. 20, 1940 |
| 2,249,426 | Jones et al. | July 15, 1941 |
| 2,414,702 | Smith | Jan. 21, 1947 |
| 2,449,704 | Jones | Sept. 21, 1948 |

FOREIGN PATENTS

| Number | Country | Date |
|---|---|---|
| 14,780 | Great Britain | 1915 |